US012286882B2

(12) United States Patent
Wang et al.

(10) Patent No.: US 12,286,882 B2
(45) Date of Patent: Apr. 29, 2025

(54) PENETRATING CUSHION DAMPING DEVICE

(71) Applicant: SICHUAN AEROSPACE SYSTEM ENGINEERING INSTITUTE, Chengdu (CN)

(72) Inventors: Xinjian Wang, Chengdu (CN); Yi Zuo, Chengdu (CN); Cheng Qian, Chengdu (CN); Anlin Jiang, Chengdu (CN); Lisheng Deng, Chengdu (CN); Yunyun Guo, Chengdu (CN); Xiandong Nie, Chengdu (CN); Jin Liu, Chengdu (CN); Peng Lu, Chengdu (CN); Yuehai Chen, Chengdu (CN); Yubin Yang, Chengdu (CN)

(73) Assignee: SICHUAN AEROSPACE SYSTEM ENGINEERING INSTITUTE, Chengdu (CN)

( * ) Notice: Subject to any disclaimer, the term of this patent is extended or adjusted under 35 U.S.C. 154(b) by 385 days.

(21) Appl. No.: 18/069,337

(22) Filed: Dec. 21, 2022

(65) Prior Publication Data
US 2024/0175324 A1   May 30, 2024

(30) Foreign Application Priority Data

Nov. 29, 2022   (CN) ......................... 202211514049.X

(51) Int. Cl.
*E21B 7/26* (2006.01)
*B64G 1/10* (2006.01)

(52) U.S. Cl.
CPC .............. *E21B 7/26* (2013.01); *B64G 1/1071* (2023.08)

(58) Field of Classification Search
CPC ........ B64G 1/105; B64G 1/1071; B64G 1/62; B64G 1/002; E21B 7/26; G01S 1/725; G01V 9/00
See application file for complete search history.

(56) References Cited

U.S. PATENT DOCUMENTS

| 4,492,111 A | * | 1/1985 | Kirkland | ................ G01N 33/24 |
| | | | | 73/9 |
| 6,488,105 B1 | * | 12/2002 | Wilcox | ..................... E21B 4/12 |
| | | | | 175/298 |

(Continued)

FOREIGN PATENT DOCUMENTS

| CN | 105929140 B | 11/2018 | |
| CN | 113721303 A | 11/2021 | |
| CN | 113721303 B | * 4/2024 | ............... G01V 9/00 |

*Primary Examiner* — Nathaniel C Chukwurah

(57) ABSTRACT

The disclosure discloses a penetrating cushion damping device comprising a penetrator, and belongs to the field of in-situ penetrating exploration of extraterrestrial celestial bodies. A magnetic conductor encloses the non-penetrating end of the penetrator, a drag plate connected to the penetrator is provided at the lower end face of the magnetic conductor, and a magnetic source structure for generating magnetic force on the magnetic conductor is provided in the non-penetrating end of the penetrator. The disclosure utilizes the penetrating cushion anti-drag mode with the drag plate and the electromagnetic structure, which is self-adaptive to the flight penetration speed and compact in structure, reduces the jump probability, and further reduces the cushion resistance after the speed is reduced. This mode is suitable for the kinetic energy penetration exploration of extraterrestrial celestial bodies with unknown terrain conditions, and takes into account the functional requirements of penetration depth and star surface retention.

10 Claims, 2 Drawing Sheets

(56) References Cited

U.S. PATENT DOCUMENTS

| | | | | |
|---|---|---|---|---|
| 9,169,695 B1* | 10/2015 | Calvert | ................... | E21B 49/08 |
| 9,562,396 B2* | 2/2017 | Baym | ..................... | E21B 25/10 |
| 10,718,750 B1* | 7/2020 | McDaniel | ............... | F42B 25/00 |
| 2021/0040846 A1* | 2/2021 | Liu | ........................... | E21B 7/26 |

* cited by examiner

PENETRATING CUSHION DAMPING DEVICE

TECHNICAL FIELD

The disclosure relates to the field of in-situ penetrating exploration of extraterrestrial celestial bodies, and more particularly to a penetrating cushion damping device.

BACKGROUND

For the exploration and research of extraterrestrial celestial bodies, the physical characteristic parameters of deep star soil are the key to deducing the evolution mechanism of the Earth, the origin of water on the Earth, the distribution law of the cosmic components, etc. It is a common exploration manner to drill or penetrate the celestial bodies with penetrators of bullet shape. Among them, the kinetic energy penetrating detector is a detection method with low kinetic energy demand cost and large detection depth. However, it is necessary to consider both the depth of exploration and the requirement of exploration data and satellite communication.

At present, split schemes are adopted internationally for kinetic energy penetrating exploration, such as MARs-96 of Russia and DeepSpace-2 of the United States. However, the above schemes all use different outer diameters, to directly leave the communication part on the surface of the celestial bodies, and have no cushion property at all, which aggravates the mechanical resistance conditions of electronic components. For the cushion of kinetic energy penetration, energy absorption by aluminum honeycomb deformation and energy absorption by airbag cushion are mainly adopted at present. The energy absorption by aluminum honeycomb deformation requires a large space and stroke, and the absorption capacity is fixed after the design is completed. Since it does not have the adaptability to kinetic energy, it is necessary to design sufficient absorption margin, which increases the weight cost. The airbag cushion method adopts the elastic design of airbag. However, the airbag will rebound with the same energy after cushioning, which is difficult to control and is not conducive to the stability of the attitude of the star surface retention equipment.

SUMMARY

The purpose of the disclosure is to overcome the problems existing in the penetrating cushion device in the prior art, and to provide a penetrating cushion damping device.

The following technical solutions are proposed to achieve the purpose of the disclosure:

mainly provide a penetrating cushion damping device comprising a penetrator. A magnetic conductor encloses the non-penetrating end of the penetrator, a drag plate connected to the penetrator is provided at the lower end face of the magnetic conductor, and a magnetic source structure for generating magnetic force on the magnetic conductor is provided in the non-penetrating end of the penetrator.

In one example, a penetrating cushion damping device is provided, wherein the magnetic source structure comprises a magnetic source and a magnetic source controller, and the magnetic source controller turns on the magnetic source when the penetrator is in contact with the penetrated medium.

In one example, a penetrating cushion damping device is provided, wherein when the magnetic source is turned on, the magnetic conductor generates a reverse resistance on the magnetic source structure to cushion the penetrator.

In one example, a penetrating cushion damping device is provided, wherein the magnitude of the resistance is self-adaptive to the penetrating kinetic energy of the penetrator.

In one example, a penetrating cushion damping device is provided, wherein the magnetic conductor and the drag plate are integrated.

In one example, a penetrating cushion damping device is provided, wherein the magnetic conductor is cylindrical and is covered on the penetrator.

In one example, a penetrating cushion damping device is provided, wherein the penetrating end of the penetrator is in the bullet shape.

In one example, a penetrating cushion damping device is provided, wherein the drag plate is a hollow circular plate sleeved on the penetrator.

In one example, a penetrating cushion damping device is provided, wherein the outer diameter of the drag plate is larger than the outer diameter of the penetrator.

In one example, a penetrating cushion damping device is provided, wherein the drag plate is a deployable structure or a metamorphic structure.

It is to be further understood that the technical features corresponding to each option of the above-mentioned system may be combined or replaced with each other to form a new technical solution.

Compared with the prior art, the disclosure has the following beneficial effects:

The disclosure utilizes the penetrating cushion anti-drag mode with the drag plate and the electromagnetic structure, which is self-adaptive to the flight penetration speed and compact in structure, reduces the jump probability, and further reduces the cushion resistance after the speed is reduced. This mode is suitable for the kinetic energy penetration exploration of extraterrestrial celestial bodies with unknown terrain conditions, and takes into account the functional requirements of penetration depth and star surface retention.

Figure 1:
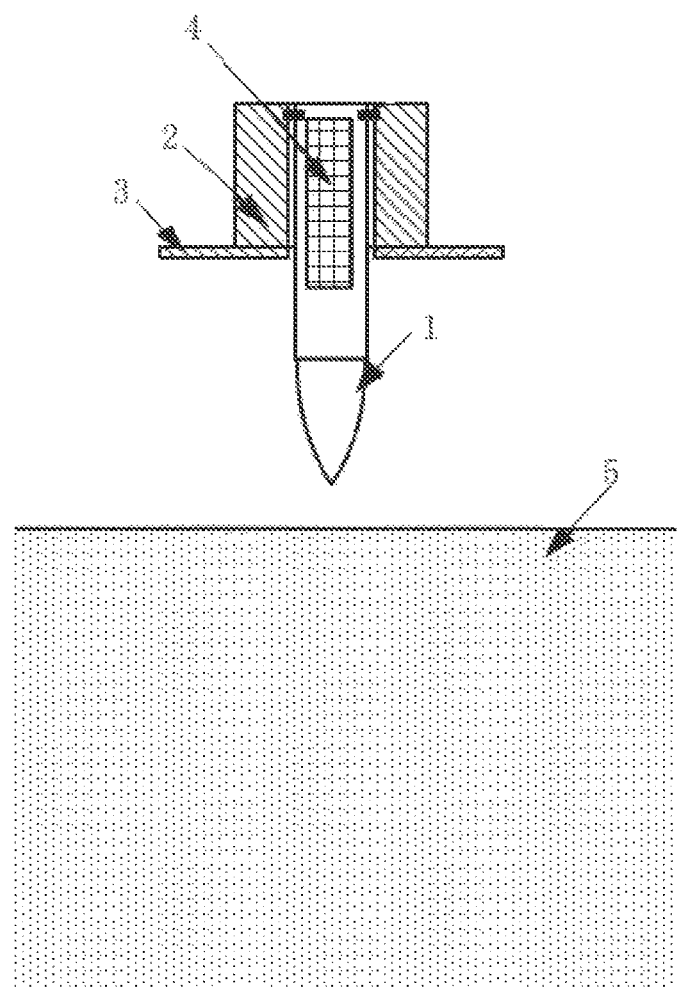
FIG. 1 is a structural schematic diagram of a penetrating cushion damping device shown in an embodiment of the disclosure.

Description of reference numerals in the drawing: 1. Penetrator; 2. Magnetic conductor; 3. Drag plate; 4. Magnetic source structure; 5. Penetrated medium; 6. Magnetic interaction.

DETAILED DESCRIPTION OF PREFERRED EMBODIMENT

The technical solutions of the disclosure will be clearly and completely described in conjunction with the drawings. Apparently, the embodiments described below are part, not all, of the embodiments of the disclosure. Based on the embodiments described herein, all other embodiments obtained by those of ordinary skill in the art without creative work are within the scope of the disclosure.

It needs to be noted that the directions or position relationships such as "central", "upper", "lower", "left", "right", "vertical", "horizontal", "inside", and "outside" in the description of the disclosure are based on those on drawings, and are used only for facilitating the description of the disclosure and for simplified description, not for indicating or implying that the target devices or components must have a special direction and be structured and operated at the special direction, therefore, they cannot be understood as the restrictions to the disclosure. Moreover, the words "first" and "second" are used only for description, and cannot be understood as an indication or implication of relative importance.

It needs to be noted in the description of the disclosure that unless otherwise specified or restricted, the words "installation", "interconnection", and "connection" shall be understood in a general sense. For example, the connection may be a fixed connection, removable connection, integrated connection, mechanical connection, electrical connection, direct connection, indirect connection through intermediate media, or connection between two components. Persons of ordinary skill in the art can understand the specific meanings of the terms above in the disclosure as the case may be.

Moreover, the technical characteristics involved in different embodiments of the disclosure as described below can be combined together provided there is no discrepancy among them.

In an exemplary embodiment, the disclosure provides a penetrating cushion damping device comprising a penetrator 1 as shown in FIG. 1. A magnetic conductor 2 encloses the non-penetrating end of the penetrator 1, a drag plate 3 connected to the penetrator 1 is provided at the lower end face of the magnetic conductor 2, and a magnetic source structure 4 for generating magnetic force on the magnetic conductor 2 is provided in the non-penetrating end of the penetrator 1.

Specifically, the magnetic source structure 4 comprises a magnetic source and a magnetic source controller, and the magnetic source controller generates an overload acceleration and turns on the magnetic source when the penetrator 1 is in contact with the penetrated medium 5.

When the magnetic source is turned on, the magnetic conductor 2 generates a reverse resistance on the magnetic source structure 4 to cushion the penetrator 1. The magnitude of the resistance is self-adaptive to the penetrating kinetic energy of the penetrator 1.

Figure 2:
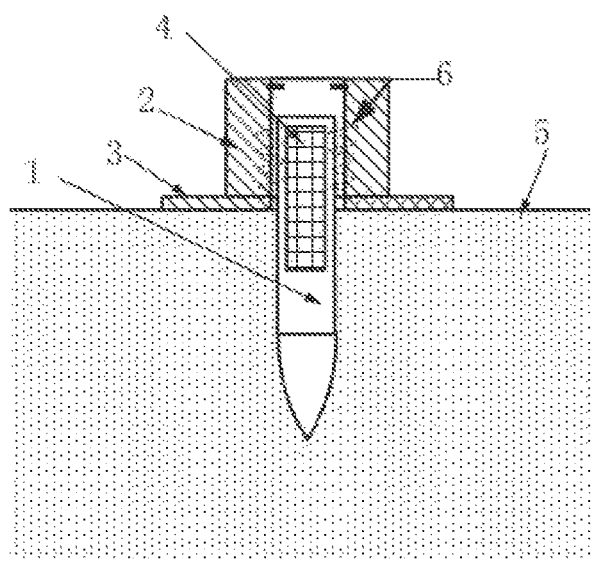
FIG. 2 is a schematic diagram of a penetration cushion process shown in an embodiment of the disclosure.

As shown in FIG. 2, the penetrator 1, the magnetic conductor 2, the drag plate 3, and the magnetic source structure 4 are integral structures, and the integral structure will penetrate into the penetrated medium 5 under the action of a certain kinetic energy during specific use.

Further, the outer diameter of the drag plate 3 is larger than the outer diameter of the penetrator 1. Due to the difference in the outer diameter of the drag plate 3 and the penetrator 1, when the drag plate 3 is in contact with the penetrated medium 5, the two impacted bodies will be separated, and the penetrator 1 and the magnetic conductor 2 will also be separated. At the same time, under the action of overload and other factors, the magnetic source controller will be turned on. When the magnetic source controller is turned on, the magnetic source inside the penetrator 1 will release a certain magnetic field, which will interact with the magnetic conductor 2. At this time, the magnetic conductor 2 will be subjected to the magnetic interaction 6, which blocks the moving magnetic source in the penetrator 1 and thereby cushions the penetrator 1.

Further, the magnitude of the resistance is related to the relative motion speed, 6664540 magnetic field strength, magnetic permeability, etc. The greater the relative motion speed, the greater the resistance; the smaller the relative motion speed, the smaller the resistance. With this effect, a certain cushion effect will be generated on the penetrator, and the cushion effect will be self-adaptive to the penetrating kinetic energy through the relative motion speed.

When the magnetic source is completely separated from the magnetic conductor 2, the magnetic interaction 5 will also disappear, the drag plate 3 and the magnetic conductor 2 will stay on the planet surface, and the penetrator 1 will continue to penetrate under the action of residual kinetic energy. After the penetration, physical property exploration and analysis will be carried out for the corresponding position.

In one example, a penetrating cushion damping device is provided, wherein the magnetic conductor 2 and the drag plate 3 are integrated. Since the magnetic conductor 2 and the drag plate 3 are integrated, under the constraint of the interaction force between the magnetic source and the magnetic conductor 2 during the cushion process, the possibility of bounce between the magnetic conductor 2 and the drag plate 3 remaining on the star surface is greatly reduced, the jump probability and other phenomena are avoided, and the attitude of the star surface retention equipment is ensured.

In one example, a penetrating cushion damping device is provided, wherein the magnetic conductor 2 is cylindrical and is covered on the penetrator 1, specifically, the magnetic conductor 2 entirely envelops the penetrator 1, so that electromagnetic induction can be generated, and the magnetic conductor 2 can be connected by shear pins, screws, pins, etc., and the specific connection mode can be designed according to specific conditions. It will not be repeated here.

In one example, a penetrating cushion damping device is provided, wherein the penetrating end of penetrator 1 is in the bullet shape.

In one example, a penetrating cushion damping device is provided, wherein the drag plate 3 is a hollow circular plate sleeved on the penetrator 1.

In one example, a penetrating cushion damping device is provided, wherein the drag plate 3 is a deployable structure or a metamorphic structure, and may be formed by unfolding in a contracted state at a position of large diameter.

The above specific embodiments are detailed descriptions of the disclosure, and it could not be considered that the specific embodiments of the disclosure are only limited to these descriptions. Persons of ordinary skill in the art of the disclosure could also make some simple deductions and substitutions without departing from the concept of the disclosure, which should be deemed to fall within the protection scope of the disclosure.

The invention claimed is:

1. A penetrating cushion damping device, comprising a penetrator (1), wherein a magnetic conductor (2) encloses the non-penetrating end of the penetrator (1), a drag plate (3) connected to the penetrator (1) is provided at the lower end face of the magnetic conductor (2), and a magnetic source structure (4) for generating magnetic force on the magnetic conductor (2) is provided in the non-penetrating end of the penetrator (1).

2. The penetrating cushion damping device of claim 1, wherein the magnetic source structure (4) comprises a magnetic source and a magnetic source controller, and the magnetic source controller turns on the magnetic source when the penetrator (1) is in contact with the penetrated medium (5).

3. The penetrating cushion damping device of claim 2, wherein when the magnetic source is turned on, the magnetic conductor (2) generates a reverse resistance on the magnetic source structure (4) to cushion the penetrator (1).

4. The penetrating cushion damping device of claim 3, wherein the magnitude of the resistance is self-adaptive to the penetrating kinetic energy of the penetrator (1).

5. The penetrating cushion damping device of claim 1, wherein the magnetic conductor (2) and the drag plate (3) are integrated.

6. The penetrating cushion damping device of claim 1, wherein the magnetic conductor (2) is cylindrical and is covered on the penetrator (1).

7. The penetrating cushion damping device of claim 1, wherein the penetrating end of the penetrator (1) is in the bullet shape.

8. The penetrating cushion damping device of claim 1, wherein the drag plate (3) is a hollow circular plate sleeved on the penetrator (1).

9. The penetrating cushion damping device of claim 8, wherein the outer diameter of the drag plate (3) is larger than the outer diameter of the penetrator (1).

10. The penetrating cushion damping device of claim 1, wherein the drag plate (3) is a deployable structure or a metamorphic structure.

\* \* \* \* \*